United States Patent
Chakraborty et al.

(10) Patent No.: US 11,757,976 B2
(45) Date of Patent: Sep. 12, 2023

(54) UNIFIED APPLICATION MANAGEMENT FOR HETEROGENEOUS APPLICATION DELIVERY

(71) Applicant: VMware, Inc., Palo Alto, CA (US)

(72) Inventors: Parag Chakraborty, Palo Alto, CA (US); Nigitha Alugubelli, New York, NY (US); Rahul Kumar, Bangalore (IN); Sreedevi Mohan, Bangalore (IN); Thiruekamban Poongkunran, Palo Alto, CA (US); Siva Praveen Mummaneni, Bangalore (IN); Yaping Xie, Palo Alto, CA (US); Sabarishkumar Rajagopal, Palo Alto, CA (US); Amrainder Singh, Bangalore (IN); Sriharsha Mallur Apprameya, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 11 days.

(21) Appl. No.: 17/238,622

(22) Filed: Apr. 23, 2021

(65) Prior Publication Data
US 2022/0345517 A1 Oct. 27, 2022

(51) Int. Cl.
*H04L 67/08* (2022.01)
*H04L 67/10* (2022.01)
*G06F 8/71* (2018.01)
*H04L 67/63* (2022.01)

(52) U.S. Cl.
CPC ............... *H04L 67/08* (2013.01); *G06F 8/71* (2013.01); *H04L 67/10* (2013.01); *H04L 67/63* (2022.05)

(58) Field of Classification Search
CPC ....... H04L 67/08; H04L 67/10; H04L 67/327; G06F 8/71
USPC .......................................................... 709/217
See application file for complete search history.

(56) References Cited

U.S. PATENT DOCUMENTS

| | | | |
|---|---|---|---|
| 2013/0254024 A1* | 9/2013 | Woods | G06Q 30/02 |
| | | | 705/14.51 |
| 2017/0308368 A1* | 10/2017 | Trevathan | G06F 8/71 |
| 2017/0353468 A1* | 12/2017 | Petys | H04W 12/08 |
| 2018/0143967 A1* | 5/2018 | Anbazhagan | G10L 15/183 |
| 2019/0121631 A1* | 4/2019 | Hua | H04L 67/34 |
| 2020/0257516 A1* | 8/2020 | Totale | G06F 8/71 |

\* cited by examiner

*Primary Examiner* — Cheikh T Ndiaye
*Assistant Examiner* — Ayele F Woldemariam
(74) *Attorney, Agent, or Firm* — Thomas Horstemeyer, LLP

(57) ABSTRACT

Disclosed are various examples of unified application management for heterogeneous application delivery. Application metadata for various applications can be received from management services and can be analyzed according to application unification rules to identify multiple application variants of a particular application. A unified application can be generated to represent the multiple application variants that are identified. Application entitlements can be defined for the unified application model, and the management services can provide access to the particular application according to the entitlements.

20 Claims, 6 Drawing Sheets

UNIFIED APPLICATION MANAGEMENT FOR HETEROGENEOUS APPLICATION DELIVERY

BACKGROUND

Companies, organizations, and other enterprises can provide access to an application in many different ways. Management services utilized by the enterprise can assist an application administrator by delivering applications to end users. To enable application access on a local device, the application can be installed to the local device. In other cases, a virtual desktop infrastructure (VDI) can include the application. In further situations, the application can be provided using a remote desktop session host (RDSH). There are yet further application variants, including web applications, published applications, and others. Each variant or access type for the application can have benefits and drawbacks.

However, existing technologies can treat each variant or access type as a completely different application in the system. This can require a user to request access to the same application multiple times. For example, a user may have to request access to an installable application for their personal device, and then later request access to a VDI or RDSH variant of the same application for use in an office scenario. An administrator may then have to approve each request separately. This can result in repetitious work for what the user and the administrator can think of as a single application. Even where applications are distributed without a user request, the administrator may have to identify and distribute multiple different application variants for the same application. As a result, there is a need for better solutions for application management.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to unified application management for heterogeneous application delivery. Enterprises can deliver applications to end users in a number of ways. To enable application access on a client device, the application can be installed to the device. In other cases, a virtual desktop infrastructure (VDI) can include the application. In further situations, the application can be provided using a remote desktop session host (RDSH). There are yet further ways to provide application access, including web applications, published applications, thin-wrapped applications and others. A single application can include application variants corresponding to each delivery type and each platform for installable applications.

However, existing technologies can treat each application variant as a completely different application in the system. This can require a user to request access to the same application multiple times. For example, a user may have to request access to an installable application for their personal device, and then later request access to a VDI or RDSH variant of the same application for use in an office scenario. An administrator may then have to approve each request separately. This can result in repetitious work for what the user and the administrator can think of as a single application. Even where applications are distributed without a user request, the administrator may have to identify and distribute multiple different application variants for the same application.

Applications can be updated with new features from time to time. For example, developers can develop new application features for one platform or delivery type before it is developed for another platform or delivery type. Alternatively, the enterprise can obtain and approve a new version with new application features for one platform or delivery type before the new version is obtained and approved for another platform or delivery type. These scenarios can cause an inconsistent user experience if a user has access to multiple application variants. As a result, there is a need for better solutions for application management. However, the present disclosure describes mechanisms that can provide unified application management and consistent user experience for multiple different platforms and delivery types using physical and virtual devices.

Figure 1:
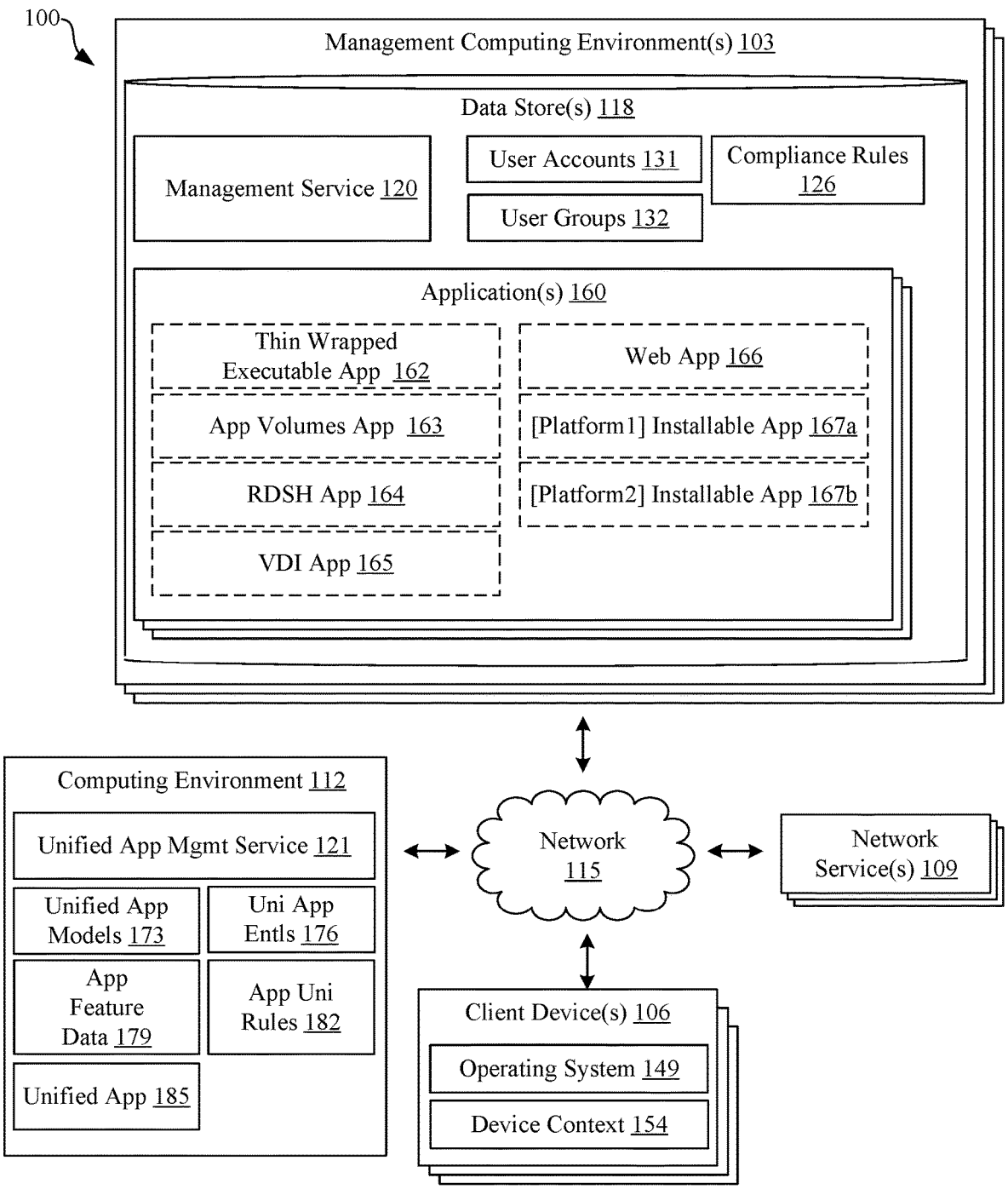
FIG. 1 is a drawing of a networked environment including components that provide unified application management, according to the present disclosure.

With reference to FIG. 1, shown is an example of a networked environment 100. The networked environment 100 can include one or more management computing environment 103, one or more client devices 106, one or more network services 109, and a computing environment 112, in communication with one another over a network 115.

The network 115 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 115 can also include a combination of two or more networks 115. Examples of networks 115 can include the Internet, intranets, extranets, virtual private networks (VPNs), and similar networks.

The management computing environment 103 can include, for example, a server computer, or any other system providing computing capability. Alternatively, the management computing environment 103 can include a plurality of computing devices that are arranged, for example, in one or more server banks, computer banks, or other arrangements. The management computing environments 103 can include a grid computing resource or any other distributed computing arrangement. The computing devices can be located in a single installation or can be distributed among many different geographical locations.

The management computing environments 103 can also include or be operated as one or more virtualized computer instances. For purposes of convenience, the management computing environment 103 is referred to herein in the singular. Even though the management computing environment 103 is referred to in the singular, it is understood that a plurality of management computing environments 103 can be employed in the various arrangements as described above. As the management computing environment 103 communicates with the client device 106 remotely over the network 115, the management computing environment 103 can be described as a remote management computing environment 103.

Various applications can be executed in the management computing environment 103. For example, each management computing environment 103 can include a management service 120 that includes a management console, as well as other applications that may be executed in the management computing environment 103. Various data is stored in one or more data store 118 that is accessible to the management computing environment 103. The data store 118 may be representative of a plurality of data stores 118, which can include relational databases, object-oriented databases, hierarchical databases, hash tables or similar key-value data stores, as well as other data storage applications or data structures. The data stored in the data store 118 is associated with the operation of the various applications or functional entities described below This data can include one or more device records, compliance rules 126, user accounts 131, and user groups 132, as well as potentially other data.

The management service 120 can be executed to oversee the operation of client devices 106 and virtual devices that provide access to enterprise data and applications 160. Managed client devices 106 can be enrolled with a management service 120. Virtual devices can include virtual machines and other virtual components that provide desktop, application, or desktop and application services that are accessed by client devices 106. In some examples, an enterprise, such as a company, organization, or other entity, can operate the management service 120 to oversee or manage the operation of the client devices 106 of its employees, contractors, customers, or other users having accounts with the enterprise. The management service 120 can further cause device records, configuration policies, user groups 132, user accounts 131 to be created, modified, or removed from the data store 118. Each management service 120 can provide its associated users with access to various applications 160. Each management service 120 can also provide access to multiple different variants of a single application 160. Each application variant can in some cases be initially considered as an individual application 160.

In some cases, a single enterprise can use multiple different management services 120 to provide application access to users having accounts with the enterprise. In some situations, multiple management services 120 used by a single enterprise can have access to a substantially or partially overlapping set of user accounts 131, user groups 132, and compliance rules 126.

The user groups 132 can refer to a group of user accounts 131 with the management service 120. User groups can be created by an administrator of the management service such that a batch of client devices 106 can be configured according to common settings. For instance, an enterprise can create a user group 132 for the marketing department and the sales department, where client devices 106 in the marketing department are configured differently from the client devices 106 in the sales department.

In various examples, the management service 120 can perform various compliance actions based on the current device context 154 and the compliance rules 126. The device context 154 can refer to states associated with the client device 106, such as a network 115 to which the client device 106 is connected, a jailbreak status, a geolocation, device configurations, installed applications, a user account 131 or user group 132 associated with a login session, and other device state information.

Compliance actions can include, for example, generating and sending a notification of the compromise to an administrator of the enterprise environment, causing the client device 106 to be wiped or otherwise cleaned of various software or settings (e.g., reset to factory settings), restricting access to one or more applications 160 or application variants of the applications 160, restricting access to different types of data (e.g., enterprise data), or other actions that can ensure the safety of the enterprise with respect to a compromised device.

As mentioned above, a management service 120 can provide access to a number of different applications 160. A single application 160 can have one or more application variants, including a thin wrapped executable application 162, an application volumes application 163, a RDSH application 164, a VDI application 165, a web application 166, and platform-specific installable applications 167, such as an installable application 167a for client device operating systems corresponding to platform 1, and an installable application 167b for client device operating systems corresponding to platform 2, among other delivery-specific and platform-specific application variants. Each application variant can include one or more different versions, and each version can be associated with a set of application features. Each application variant can be considered as an individual application 160 by the management service(s) 120.

The RDSH application 164 can be provided using a network service 109 or a management computing environment 103. The RDSH application 164 can refer to an application variant that uses server-operating-system-based sessions to provide desktops and applications that can support multiple users per virtual machine. The RDSH application 164 can be an application variant provided through software-as-a service (SaaS), platform-as a service (PaaS), or infrastructure-as-a-service (IaaS) where a RDSH desktop operating system is also provided for remote access by a client device 106. The client device 106 can access a RDSH desktop operating system and open a RDSH application 164 within that RDSH desktop. The client device 106 can alternatively be running a local operating system 149 or a VDI operating system, and still access the RDSH application 164.

The RDSH application 164 can enable quick update roll-outs because the management service 120 can provision an RDSH server rather than numerous client devices 106. The RDSH server can be a server of the management computing environment 103 or the network service 109, which can allow multiple client devices 106 to connect to access session-based desktops, published applications and server resources. The RDSH server can allow a client device 106 to access RDSH applications 164 and desktop operating systems that are unsupported or are otherwise typically not installable on that particular client device 106.

The VDI application 165 can be an application variant provided using a VDI server computer, or any other system providing computing capability. The VDI server can be part of a management computing environment 103 or separate network service 109. The VDI server can provide operating-system-based desktops and applications that can generally include a single user per virtual machine. The VDI server can provide SaaS or PaaS access to a VDI application 165. The VDI server can also be capable of providing IaaS access to VDI applications 165, where a VDI desktop operating system is also provided for remote access by a client device 106. The client device 106 can access a VDI desktop operating system and open a VDI application 165 within that VDI desktop. However, the client device 106 can alternatively be running a local operating system 149 or a RDSH operating system, and still access the VDI application 165. The VDI server can provide access to any number of VDI applications 165.

The web application 166 can include an application variant provided using a web application server, or any other system providing computing capability. The web application server can include the web application 166. The web application 166 can refer to an instance or type of application that is accessible through a web browser user interface of a client device 106. The web application server can provide access to any number of web applications 166.

Installable applications 167 can refer to an application variant that can be downloaded and installed from the management computing environment 103 or a network service 109. Each installable application 167 can be installable to one or more platforms. A platform can correspond to an operating system of a client device 106. For example, if platform 1 refers to a GOOGLE ANDROID® platform, client devices 106 that include a GOOGLE ANDROID® operating system 149 can install the installable application 167a. If platform 2 refers to a MICROSOFT WINDOWS® platform, client devices 106 that include a MICROSOFT WINDOWS® operating system 149 can install the installable application 167b.

A thin-wrapped executable application 162 can refer to a portable application executable that is a wrapped instance of a conventional installable application 167. However, the thin-wrapped executable application 162 does not need to be installed in a traditional sense. The thin-wrapped executable application 162 can be executed using client devices 106 that have incompatible hardware that cannot execute the conventional application. Further, the thin-wrapped executable application 162 can include prerequisite software or operating system components, so that it is executable using client devices 106 that lack these prerequisites. For example, the thin-wrapped executable application 162 can enable execution of a legacy web application by providing a legacy web browser, where the legacy web application is incompatible with the current web browser.

An application volumes application 163 can refer to a conventional installable application 167 that is provided using an instance of an applications volume or application stack of the management service 120. The application volumes application 163 can behave as if it is natively installed, while being provided using an administratively defined application container that can be distributed to one or many client devices 106, and virtual devices that are accessed using a client device 106.

The client device 106 is representative of one or more client devices that may be connected to the network 115. Examples of client devices 106 include processor-based systems, such as desktop computers, laptop computers, a personal digital assistant, a cellular telephone, a smartphone, a tablet computer system, smart speakers or similar headless devices, or any other device with like capability. The client device 106 can also be equipped with networking capability or networking interfaces, including a localized networking or communication capability, such as a near-field communication (NFC) capability, radio-frequency identification (RFID), read or write capability, or other localized communication capability.

A user can utilize a personal or enterprise client device 106 to access various application variants managed by the management services 120. For example, the client device 106 can include an installable application 167 such as the platform 1 installable application 167a or the platform 2 installable application 167b, depending on an operating system platform of the client device 106. The client device can also access application variants such as a web application 166 or virtualized variant of the application 160, such as the VDI application 165 or the RDSH application 164, through a network service 109. The management service 120 can manage access to various application variants using the network services 109. The network services 109 can be part of the management computing environment 103 or can be operated by a third party.

The client device 106 can include an operating system 149 and can be associated with a device context 154. The operating system 149 can be configured to execute various client applications. Examples of operating systems 149 include MICROSOFT WINDOWS®, APPLE macOS®, APPLE iOS®, GOOGLE ANDROID®, and various distributions of Linux. The client applications can include web browsers, enterprise applications, social networking applications, word processors, spreadsheet applications, and media viewing applications. The device context 154 can include various hardware and software parameters, configurations, and statuses. Static parameters can refer to parameters that are not subject to change based on usage of the client device 106 and usage of a networked environment 100.

The computing environment 112 can include, for example, a server computer, or any other system providing computing capability. Alternatively, the computing environment 112 can include a plurality of computing devices that are arranged, for example, in one or more server banks, computer banks, or other arrangements. The computing environment 112 can include a grid computing resource or any other distributed computing arrangement. The computing devices can be located in a single installation or can be distributed among many different geographical locations. The computing environment 112 can be operated by a third-party service with respect to the management computing environments 103; alternatively, the computing environment 112 can be affiliated with and part of one or more management computing environment 103.

The computing environment 112 can execute one or more applications including a unified application management (UAM) service 121. The computing environment 112 can also include one or more data store storing data that includes unified application models 173, unified application entitlements 176, application feature data 179, and application unification rules 182.

The UAM service 121 can identify all applications 160 that are deployed, provisioned, available, or otherwise managed by one or more management services 120. The UAM service 121 can receive metadata for these applications 160 to generate a unified application model 173 for each application 160, and then analyze the unified application models 173 according to application unification rules 182, to associate applications 160 that are multiple application variants of the same application into a unified application 185. A unified application 185 can include a mapping or logically defined application that includes a set of unified application models 173 corresponding to multiple application variants of a single application product.

The UAM service 121 can define unified application entitlements 176 for user accounts 131 and user groups 132 to access the bundle of application variants specified in a unified application 185. The UAM service 121 can also provide a consistent user experience by providing a user or group with access to specific versions of the application variants that have a matching set of application features. The features for the applications 160 can be tracked using one or more application feature data 179.

The UAM service 121 can define unified application entitlements according to user accounts 131 and user groups 132. To this end, the UAM service 121 can transmit a request for, receive, and otherwise access the user accounts 131, user groups 132, and compliance rules 126 for each management service 120 employed by an enterprise using the UAM service 121.

The unified application models 173 can represent the applications 160 in a single data structure and format across multiple platforms, products, and delivery types. The unified application models 173 can include a common set of parameters that can be used to identify whether corresponding applications 160 are application variants of a single application. Some applications 160 can include a value for every parameter, and others can include a value for a subset of the common set of parameters. The value can include a string, a link, a filename, a data element, an image such as an icon or another image, or another type of value. The unified application models 173 can include a textual, code or other format capable of representing the common set of parameters. One non-limiting example of a unified application model 173 is provided in table 1.

The unified application model 173 can include application identifying parameters that include name, version, publisher, bundle ID (e.g., applicable to APPLE iOS®, GOOGLE ANDROID®), product code (e.g., applicable to WINDOWS®), upgrade code (e.g., applicable to WINDOWS®), SHA or another hash of the EXEs (e.g., applicable to WINDOWS®), as well as application icons, images, and other parameters.

TABLE 1

{
  "source": "string/enum",
  "application": [
    {
      "id": "string",
      "name": "string",
      "manufacturer": "string",
      "icon": "string",
      "file_name": "string",
      "file_type" : "string/enum", TABLE 1-continued "file_size": "string",
      "file_version": "string",
      "file_SHA": "string",
      "category": "string/enum",
      "download_link": "string",
      "platform": "string/enum",
      "version": "string" ,
      "upgrade_code": "string",
      "product_code": "string"
    }
  ]
}

The UAM service 121 can, for each unified application 185, define a globally unique name or another unique identifier for an associated set of applications 160 that are variants of the same application or variant applications of a single product. In some cases, the UAM service 121 can generate a unified application 185 by listing application identifiers of the associated set of unified application models 173 in a separate data structure of the unified application 185. In other cases, the UAM service 121 can generate the unified application 185 by inserting or writing the globally unique identifier of a product into each of the unified application models 173 that are variants of a single product or application.

The UAM service 121 can also enable application data sharing to provide a smooth and unified user experience across all formats and platforms. For example, the UAM service 121 can identify network service 109 backends, as well as files, documents, configurations, states, and other data used or generated by applications 160. The application data can be identified from a management service 120, a client device 106, or a network service 109. The UAM service 121 can automatically configure all applications variants unified according to a unified application 185, based on a most-recent user configuration on a particular application variant. The UAM service 121 can also configure all application variants to access all network service 109 backends, files, and documents that are accessed by a particular application variant.

The unified application entitlement 176 can specify entitlements for user accounts 131 and user groups 132 to access the bundle of application variants specified in a unified application 185. The unified application entitlement 176 can also specify device-context-specific application variants that should be used when a client device 106 is associated with a particular user account 131, user group 132, configuration, network 115, geolocation, or other states of the device context 154.

The application unification rules 182 can include rules and algorithms and other instructions to identify whether a unified application model 173 for an application 160 should be mapped to a particular unified application 185. The rules can include threshold similarities including a threshold number or percentage of matched and/or approximate-matched parameters between one or more unified application models 173 of the unified application 185, and an additional unified application model 173. A matched parameter can refer to an exact or approximate match. An approximate match can indicate that there are differences in values for a particular parameter, but part of each value is included in the additional unified application model 173, and one of the existing unified application models 173 of the unified application 185. Application unification rules 182 can also include rules for matching that compares values corresponding to different parameters stored in a different unified application model 173.

Application metadata can be different in a UEM service 120 that provides platform-specific installable applications 167, as compared to metadata from another management service 120 that provides thin wrapped executable applications 162, application volumes applications 163, RDSH applications 164, VDI applications 165, and so on. As a result, while the unified application models 173 can include a number of universal parameters, they can also include platform or delivery-specific parameters. However, the unified application management service 121 can still compare and associate application variants using the values corresponding to different parameters in the unified application models 173.

Figure 2:
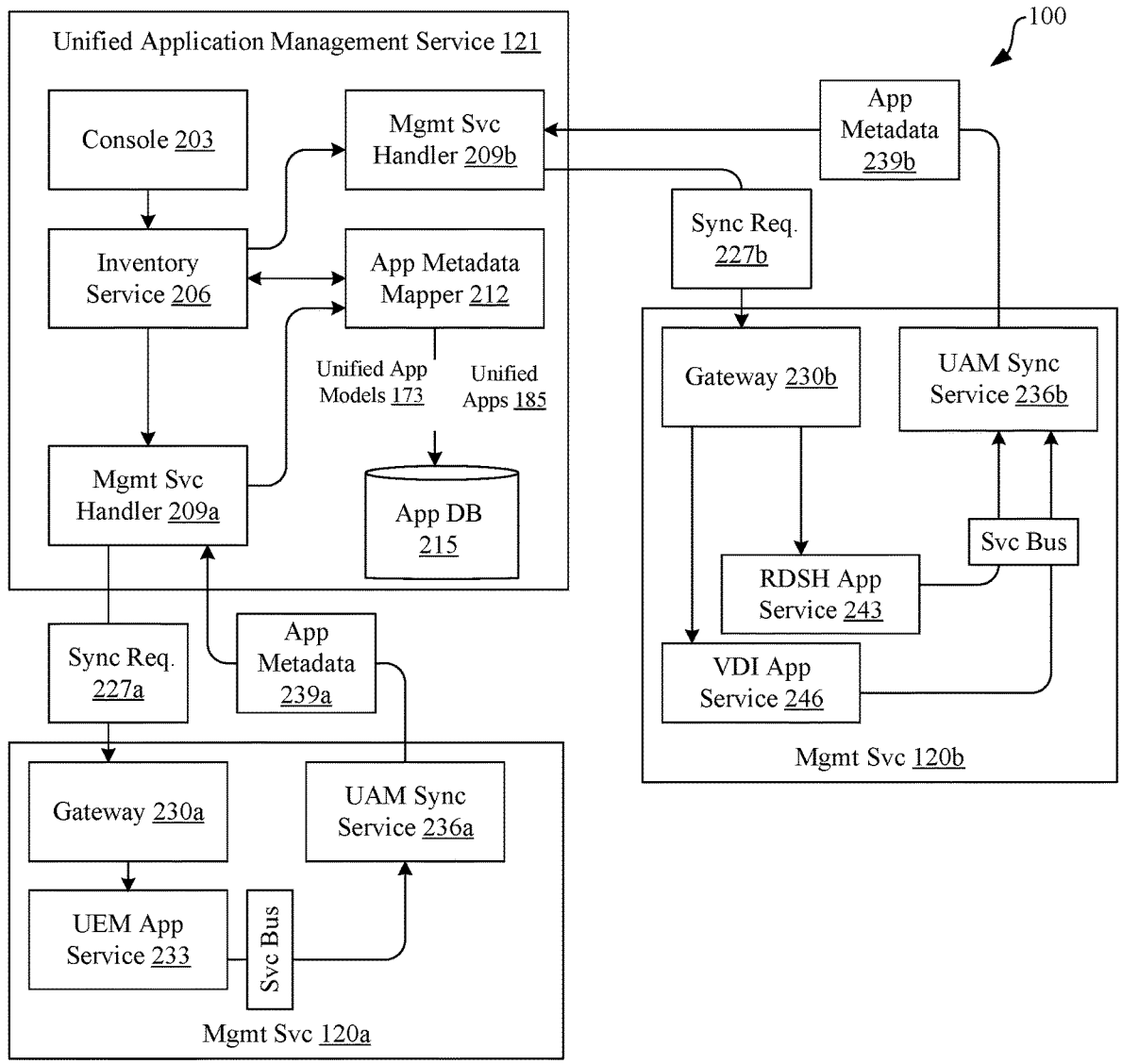
FIG. 2 is a drawing depicting an example of functionalities performed by components of the network environment for unified application management, according to the present disclosure.

FIG. 2 is a drawing depicting an example of functionalities performed by components of the networked environment 100 for unified application management. Generally, this figure shows how the components of the networked environment 100 interact with the UAM service 121 to generate unified application models 173 and similar groups or associated products in unified application 185 maps.

In this example, the networked environment 100 can include a UAM service 121 and two management services 120a and 120b. Management services 120a and 120b can be components of a single management service 120, or they can be separately-operated management services 120. An enterprise can use both management services 120a and 120b to provide applications 160 and other functionalities to users. However, existing technologies can consider each variant of a single application product as a separate application for management purposes.

The UAM service 121 can identify all applications 160 that are deployed, provisioned, available, or otherwise managed by one or more management services 120. The UAM service 121 can receive metadata for these applications 160 to generate a unified application model 173 for each application 160. The UAM service 121 can then analyze the unified application models 173 according to application unification rules 182 to associate applications 160 that are multiple application variants of the single application, into a unified application 185.

The UAM service 121 can generate a UAM console 203 or another user interface. The UAM service 121 can also include an inventory service 206, and one or more management service handlers 209, an application metadata mapper 212, and an application database 215. Management service handlers 209 can include management service handlers 209a and 209b.

The UAM console 203 enables an administrator to identify or link the management service 120a and the management service 120b for unified application management through the UAM console 203 of the UAM service 121. The administrator can enter or otherwise identify a network endpoint for communications with each of the management services 120a and 120b. A management service 120 can provide a public application programming interface (API) network endpoint that is accessible across the network 115. The API can enable the UAM service 121 to retrieve user accounts 131, user groups 132, compliance rules 126, and application metadata for applications 160, based on one or more commands or requests transmitted to the network endpoint.

An administrator can use the UAM console 203 to specify the network endpoint such as the API network endpoint, proxy data such as a proxy host name, and a proxy port. Additional authentication parameters including API and proxy usernames, API and proxy passwords, API and proxy authentication keys, tokens such as cloud services (CSP) tokens, certificates, and other credentials to authenticate and enable communication and control of the management services 120 using the UAM service 121.

The UAM console 203 provides an interface for an administrator to use a client device 106 to interact with and control the operation of the UAM service 121. Administrators and other users can interact with the UAM console 203. For example, the UAM console 203 can include a web server that generates one or more web pages that can be displayed on a client device 106. An administrative user can interact with the web pages served by the UAM console 203. For instance, the administrative user can use the UAM console 203 to define unified application entitlements 176 for a set of applications 160 corresponding to application variants specified by a unified application 185; to manually or automatically configure application metadata syncing with each management service 120a and 120b; and to configure whether a consistent feature set, most recent set, or most secure set of applications should be provided for a user account 131 or a user group 132 across all formats and platforms.

The UAM console 203 can provide sync settings, management service 120 network endpoints, and other admin-entered and selected information to the other components of the UAM service 121. For example, an administrator can initiate on-demand sync, or automatic sync of application metadata. Once initiated, the sync can occur a single time, or continuously such as periodically or according to a schedule.

The inventory service 206 can request a specified one or more of the management service handlers 209a and 209b to fetch application metadata 239a and 239b respectively. The requests can be performed sequentially, or in parallel with full or partial concurrence. These management service handlers 209a and 209b can communicate with their respective management services 120a and 120b. For example, the management service handlers 209a and 209b can transmit respective sync requests 227a and 227b to respective management services 120a and 120b.

The management service 120a can include a single application management service, the Unified Endpoint Management (UEM) application service 233. As a result, the gateway 230a of the management service 120a can relay the command or sync request 227a to the UEM application service 233 of the management service 120a, to provide application metadata 239a for all applications 160 that are provided using the UEM application service 233. The UEM application service 233 can include a component of the management service 120a that manages client devices 106 such as desktops, laptops, tablets, mobile phones, and other devices. Generally, the UEM application service 233 can provide various installable applications 167 for physical client devices 106 that are managed by the management service 120a. In some cases, the UEM application service 233 can also manage web applications 166 and other application variants for applications 160.

The management service 120b can include multiple application management services, including the RDSH application service 243 and the VDI application service 246. As a result, the gateway 230b of the management service 120b can relay all or part of the command or sync request 227b to the RDSH application service 243, and to the VDI application service 246 respectively. The RDSH application service 243 and the VDI application service 246 can provide application metadata 239b for all applications 160 that are provided using the RDSH application service 243 and the VDI application service 246.

The RDSH application service 243 can include a component of the management service 120b that manages virtual devices, desktops, and other virtualization solutions to provide application variants corresponding to RDSH applications 164. The VDI application service 246 can include a component of the management service 120b that manages virtual devices, desktops, and other virtualization solutions to provide application variants corresponding to VDI applications 165. In some examples, each of these application services can also provide access to other application variants for applications 160.

A continuous or single update operation can be identified in a management service 120a or 120b, and the respective application services 233, 243, and 246 can push, or otherwise generate and transmit, events which can be subscribed to by respective UAM sync services 236a and 236b, which can be new components of the respective management services 120a and 120b to facilitate the sync process. These UAM sync services 236a and 236b can push or otherwise transmit the latest information to the UAM service 121.

Once the application metadata 239a and 239b is retrieved from the management services 120a and 120b, it can be delivered to the application metadata mapper 212. The application metadata mapper 212 can include a component of the UAM service 121 that can generate and store unified application models 173 in the application database 215. The application metadata mapper 212 can also analyze the unified application models 173 to map them together and generate a unified application 185 that maps or associates multiple different application variants of a single application product. The unified application 185 can refer to a set of unified application models 173 that are assigned the same unique application identifier. In other cases, the unified application 185 can refer to a data structure that lists individual application identifiers for each of the unified application models 173 corresponding to multiple application variants of a single application product. The application metadata mapper 212 can also analyze the unified application models 173 according to the application unification rules 182.

The UAM sync services 236a and 236b, or another component of the management service 120a and 120b can also generate the unified application models 173 based on instructions or commands included in the sync requests 227a and 227b. In this example, the application metadata 239a and 239b can refer to a set of the unified application models 173. In some cases, the application metadata 239a and 239b or unified application models 173 can be limited to updated information since a previous sync request 227. In other examples, a most up to date set of application metadata 239a and 239b is provided, and the application metadata mapper 212 can determine whether the information is new or existing in the application database 215. In some examples, an application variant is already present, and a new version of the application variant is identified. The application metadata mapper 212 can add the new version information to a new (or existing) unified application models 173. In other words, in some cases all versions of an application variant can be listed in a single unified application model 173, and in other cases, each version can include its own unified application models 173. In either case, all application variants and versions thereof can be associated by a unified application 185 or another logical application representation.

In one example, if multiple Chrome® Browser" application variants are identified based on the application metadata 239a and 239b, the application metadata mapper 212 can create one unified logical application representation or unified application 185 named and identified as "Chrome" within the UAM console 203 for management and entitlement purposes. Application metadata 239 can be different in a UEM management service 120a that provides platform-specific installable applications 167, as a virtualization or any other management service 120b that provides thin wrapped executable applications 162, application volumes applications 163, RDSH applications 164, VDI applications 165, and so on. However, the application metadata mapper 212 can map the application variants to a single unified application 185.

The single unified application 185 can represent all application variants such as iOS®, ANDROID®, MacOS®, and WINDOWS® installable applications 167, application volumes applications 163, thin wrapped executable applications 162, RDSH applications 164, VDI applications 165, as well as identified versions of each application variant. The UAM console 203 can show the unified application 185 represented as "Chrome," along with some information about all available application variants, and versions thereof. The UAM console 203 can also enable an administrator to quickly entitle user accounts 131 and user groups 132 to access all or a subset of the application variants of the unified application 185.

Figure 3:
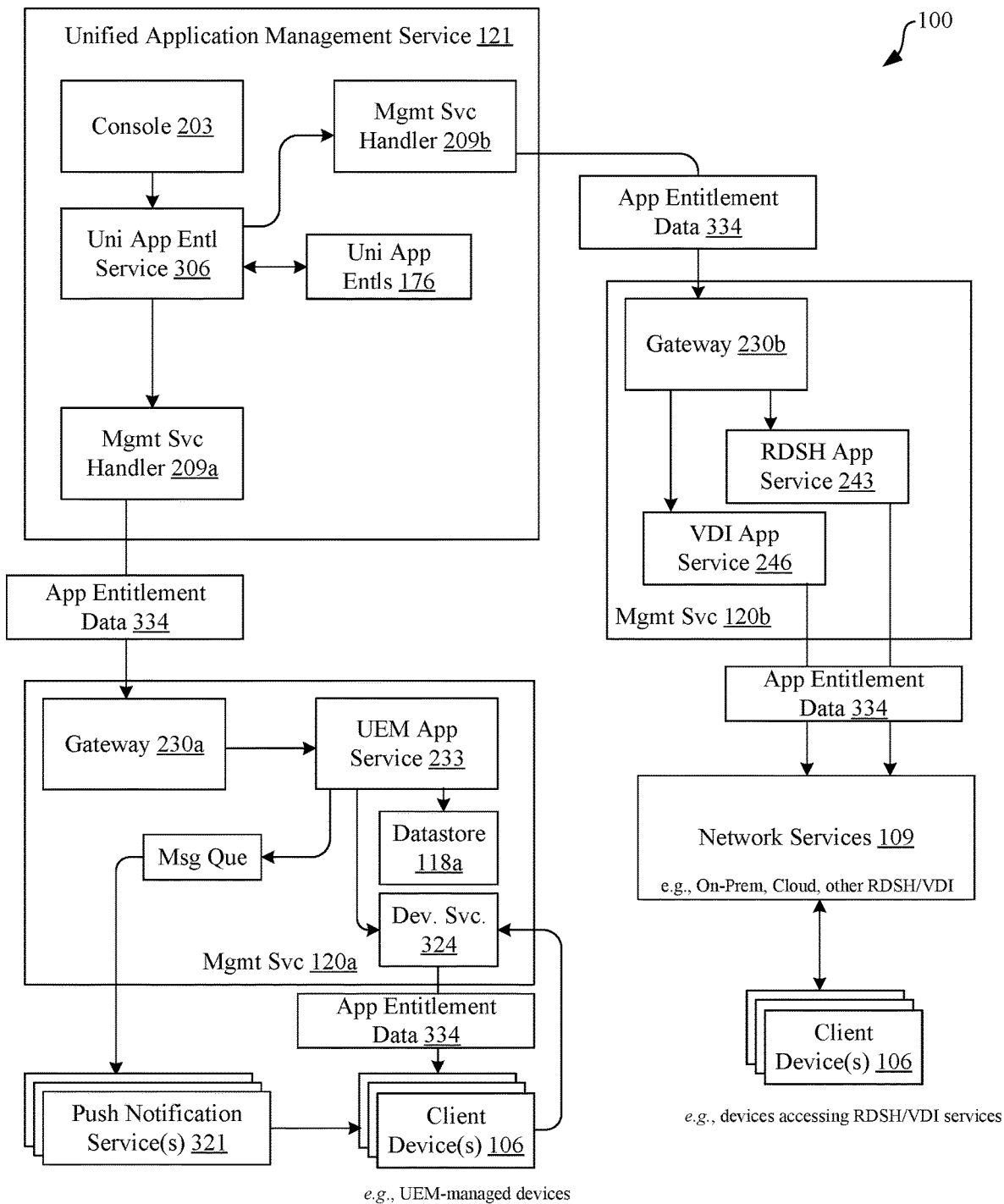
FIG. 3 is a drawing depicting another example of functionalities performed by components of the network environment for unified application management, according to the present disclosure.

FIG. 3 is a drawing depicting an example of functionalities performed by components of the networked environment 100 for unified application management. Generally, this figure shows how the components of the networked environment 100 interact with the UAM service 121 to create unified application entitlements 176, and transmit appropriate application entitlement data 334 for user accounts 131 and user groups 132 to access all or a subset of application variants of a unified application 185.

The UAM service 121 can provide a UAM console 203 to administrators for entitling all application variants specified in a unified application 185 for a particular application product. Administrators can define unified application entitlements 176 according to user accounts 131, user or device groups 132, and for specific client devices 106. The UAM console 203 can include these features once a sync of application metadata 239 is performed and the unified applications 185 of a set of unified application models 173 is completed.

Administrators can select and edit a suggested unified application entitlement 176 or define a new user-defined unified application entitlement 176 for a unified application 185. The UAM service 121 can generate a suggested unified application entitlement 176 by identifying the available application variants types (e.g., platform-specific application variants and delivery-specific application variants), and determining a default application variant for each of a plurality of predetermined or common device contexts 154.

For example, a unified application entitlement 176 can specify a web application 166, an RDSH application 164, or a VDI Application 165 as a default application variant if the device context 154 specifies a BYOD or other mobile client device 106 that is not in compliance with compliance rules 126; an installable application 167 can be specified if the same client device 106 is in compliance. The unified application entitlement 176 can specify an application volumes application 163 as a default application variant if the device context 154 specifies an on-premises desktop client device 106, and when a client device 106 is connecting to an on-premises network, and so on. In some cases, client devices 106 that are not in compliance with compliance rules 126 can be disallowed from accessing any of the application variants.

The UAM service 121 can include a unified application entitlement service 306. The unified application entitlement service 306 can provide application entitlement data 134 to the management service handlers 209a and 209b. Application entitlement data 134 can include all or a subset of the unified application entitlements 176. Application entitlement data 134 can also include appropriate requests, commands, and other instructions for the management services 120 to provide access to the unified application 185 according to the unified application entitlements 176. The management service handlers 209a and 209b can push or otherwise transmit the application entitlement data 134 to the corresponding management services 120a and 120b. In some cases, the application entitlement data 134 that is transmitted to the management service 120a can be limited to entitlement data for a subset of the unified application entitlements 176 that are applicable to application variants provided by or sourced from the management service 120a. The application entitlement data 134 that is transmitted to the management service 120b can be limited to entitlement data for a subset of the unified application entitlements 176 that are applicable to application variants provided by or sourced from the management service 120b. In other cases, the application entitlement data 134 can include complete unified application entitlements 176. The application entitlement data 134 can be propagated to underlying UEM-managed client devices 106 devices and appropriate network services 109.

The management service 120a can receive application entitlement data 134 from the UAM service 121. The gateway 230a of the management service 120a can relay the application entitlement data 134 to the UEM application service 233 of the management service 120a. The UEM application service 233 can store the application entitlement data 134 or unified application entitlements 176 in the datastore 118a, and place a command to download and install an installable application 167 into a command queue of a device service 324.

The UEM application service 233 can use a message queue and a push notification service 321 such as Windows Notification service, Google Cloud Messaging, or Apple Push Notification Service to transmit a push notification to the client device 106. The client device 106 can receive the push notification and check in with a device service 324 that can include a command queue. An agent or application executing on the client device 106 can retrieve and enact the application entitlement data 134, for example, by performing a command to download and install an installable application 167 from a specified network location.

The management service 120ba can also receive application entitlement data 134 from the UAM service 121. The management service 120b can include multiple application management services, including a RDSH application service 243 and VDI application service 246. As a result, the gateway 230b of the management service 120b can relay all or an appropriately limited part of the unified application entitlements 176 to the RDSH application service 243, and to the VDI application service 246. The RDSH application service 243 and the VDI application service 246 can then enact the unified application entitlements 176 using the network services 109. Client devices 106 can then access the virtualized application variants such as RDSH applications 164 and VDI applications 165 from the network services 109.

Application entitlements can also be synced so that any application entitlements that are defined within the management services 120a and 120b, rather than within the UAM console 203 of the UAM service 121, can be retrieved and consolidated into a unified application entitlement 176. Differences in entitlements between those of the management service 120a and the management service 120b can be reconciled according to automatic reconciliation rules or the differences can be shown in the UAM console 203 for user reconciliation. The UAM console 203 can show unified application entitlements 176 that unify all application entitlements currently effective for each application product provided by the management services 120.

Figure 4:
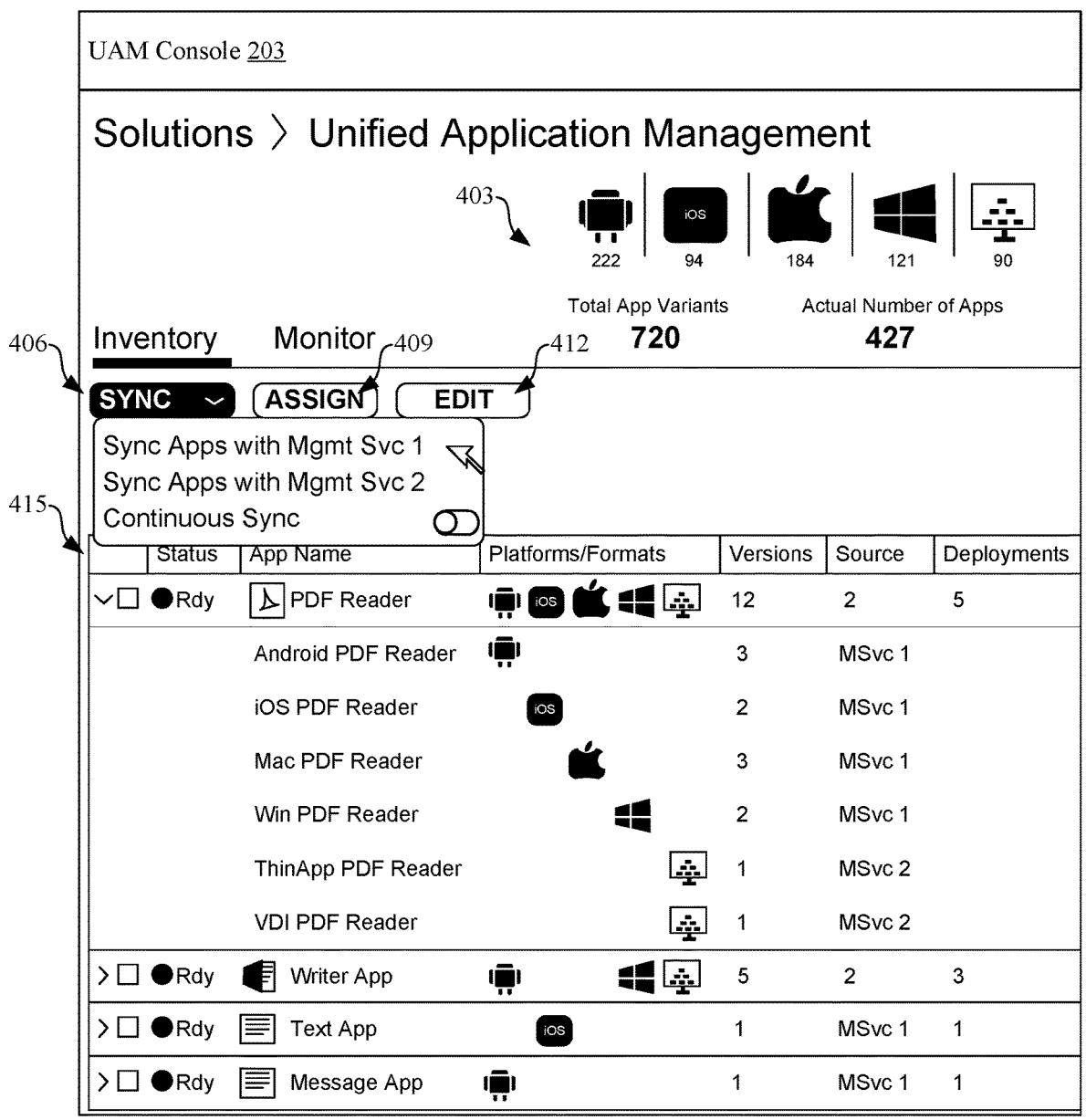
FIG. 4 is a drawing that depicts a management console for unified application management, according to the present disclosure.

FIG. 4 is a drawing that depicts a UAM console 203 for unified application management. The UAM console 203 can provide an interface for an administrator to interact with and control the operation of the UAM service 121.

The UAM console 203 can include an overview user interface area 403 that shows a number of application variants corresponding to certain platforms and delivery types such as ANDROID applications, APPLE iOS applications, APPLE MACOS applications, WINDOWS applications, and virtualized applications such as RDSH applications 164, VDI applications 165, thin wrapped executable applications 162, application volumes applications 163, and others. The overview user interface area 403 can also show a total number of application variants and an actual number of application products.

The UAM console 203 can also include a sync user interface element 406 that allows a user to initiate an on-demand or continuous sync of applications 160 with one or more management services 120. The UAM console 203 can also include a sync user interface element 406 that enables a user to initiate an on-demand or continuous sync of application entitlements with one or more management service 120.

The UAM console 203 can also include a user interface element 409 that allows a user to define or assign new unified application entitlements 176 for a selected unified application 185. The UAM console 203 can also include a user interface element 412 that allows a user to edit unified application entitlements 176 for a selected unified application 185. One or more unified application 185 can be concurrently selected through the check box or other user interface elements of the unified applications area 415.

The unified applications area 415 can list the unified applications 185 within corresponding user interface elements that include information, such as a unified application name or unique identifier for the unified application 185. Each unified application 185 user interface element can be shown in association with a status indicator and can indicate whether the unified application 185 is ready for deployment or entitlement to be completed. Each unified application 185 user interface element can be shown in association with a set of platforms or delivery types that can be graphically identified using icons corresponding to each platform or delivery type. Each unified application 185 user interface element can be shown in association with a total number of versions for all application variants of the unified application 185. Each unified application 185 user interface element can be shown in association with a number of source management services for the various application variants of the unified application 185. Each unified application 185 user interface element can be shown in association with a total number of deployments, for example, to devices, users, or groups for the various application variants of the unified application 185.

Each unified application 185 user interface element can also be expanded to provide more granular or detailed information for the application variants that are specified by the unified application 185. For example, each application variant can be shown in association with a platform or delivery type that can be graphically identified using icons corresponding to each platform or delivery type. Each application variant can be shown in association with a total number of versions for that application variant. Each application variant can be shown in association with a source management service for the application variant. Each application variant can be shown in association with a total number of deployments.

Figure 5:
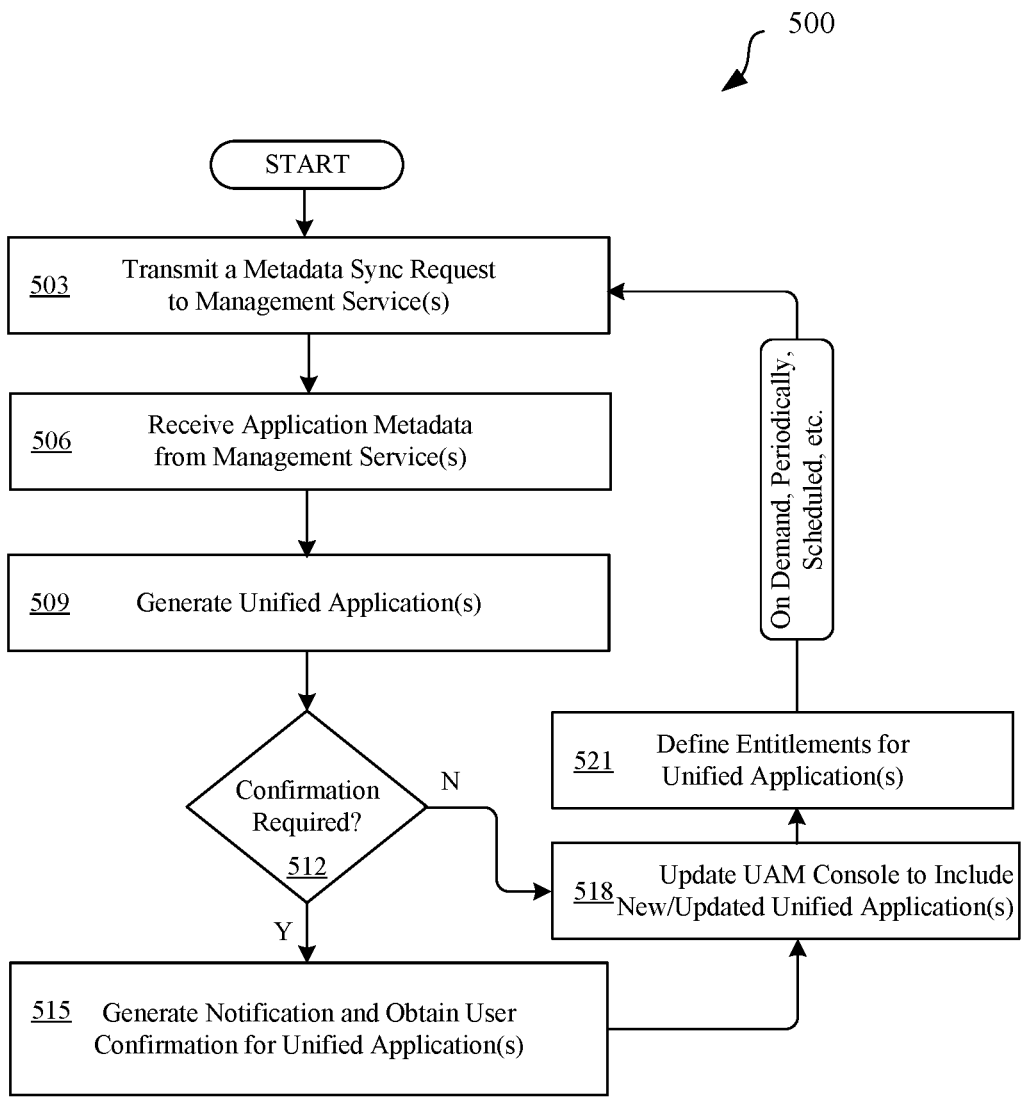
FIG. 5 is a flowchart depicting an example of functionalities performed by components of the network environment for unified application management, according to the present disclosure.

FIG. 5 is a flowchart 500 depicting an example of functionalities performed by components of the network environment for unified application management. Generally, the flowchart 500 can outline how the UAM service 121 can sync individual applications 160 provided by one or more management service 120, and map them together to generate unified applications 185.

While the flowchart 500 generally refers to actions performed by the UAM service 121, certain aspects and actions are performed by other components of the networked environment 100. Although the flowchart 500 shows a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

In step 503, the UAM service 121 can transmit a metadata sync request to a management service 120. While the example describes the interaction between the UAM service 121 and one management service 120, the UAM service 121 can transmit metadata sync requests to multiple management services 120 concurrently, sequentially, or with partial concurrence. The sync request can be transmitted to a network endpoint of the management service 120 and can be authenticated using a token, a certificate, a username, a password, and other authentication data.

In step 506, the UAM service 121 can receive application metadata 239 from the management service 120. The management service 120 can identify all of the applications 160 that it manages or provides access to, and can compile a set of application metadata 239 that identifies a number of parameters for each application 160. In some cases, a UAM sync service 236 can be installed as part of the management service 120 or otherwise in a management computing environment of the management service 120.

The UAM sync service 236 or the management service 120 can compile and transmit application metadata 239 in response to a metadata sync request, periodically, continuously, in response to updates in the applications 160 of the management service 120, and on a schedule. The UAM sync service 236 or the management service 120 can provide the application metadata 239 as a single data structure, as separate unified application models 173 for each application 160, or another set of multiple data structures or files.

In step 509, the UAM service 121 can generate unified applications 185. The UAM service 121 can process the application metadata 239 to generate a unified application model 173 for each application 160. In other examples, the application metadata 239 can be received as a set of unified application models 173. The UAM service 121 can analyze the application metadata 239 or unified application models 173 to generate unified applications 185. Each unified application 185 can include or reference a set of unified application models 173 that correspond to multiple application variants for a single application product, and versions thereof. The UAM service 121 can analyze the unified application models 173 based on the application unification rules 182 in order to group the unified application models 173 into separate sets of unified application models 173 for corresponding application products.

The application unification rules 182 can include an algorithm that takes the unified application models 173 or their parameter values as inputs to output the sets of unified application models 173 for corresponding application products. The application unification rules 182 can include threshold similarities, including a threshold number or percentage of matched or approximate-matched parameters. The matching can be performed between one or more unified application models 173 of the unified application 185 and an additional unified application model 173 under consideration. In other cases, this can involve using a grouping or machine learning algorithm that takes the unified application models 173 or their parameter values as inputs to output the sets of unified application models 173.

In step 512, the UAM service 121 can determine whether administrative or other user confirmation is required to generate a new or updated unified application 185. For example, if the match is only based on approximate matches, the grouping or matching is identified as marginal, or otherwise falls below an automatic threshold to form the unified application 185, then user confirmation can be required. If user confirmation is required, the process can move to step 515. Otherwise, if user confirmation is not required, the process can move to step 518.

In step 515, the UAM service 121 can generate a notification and obtain user confirmation to approve the new or updated unified application 185. The notification can include a notification provided as a pop up or another user interface element of the UAM console 203. The notification can also include transmitting a short message service (SMS) message, an email message, a messenger application message, or another message to an appropriate network endpoint such as a client device 106. The UAM console 203 or other notification can identify the new or updated unified application 185, the set of unified application models 173, the changes from a previous version if any, and a textual, visual, or other description of a reason that the user confirmation is requested. The user confirmation can be received by a user logging in and interacting with a user interface element of the UAM console 203, or through a message returned or transmitted to the UAM service 121.

In step 518, the UAM service 121 can update the UAM console 203 to include the new or updated unified applications 185. A user can then edit the unified application 185 and manage the set of application variants as a single application through the UAM console 203.

In step 521, the UAM service 121 can define unified application entitlements 176 for each of the unified applications 185. The UAM service 121 can provide a UAM console 203 or another user interface to administrators for entitling all application variants specified in a unified application 185 for a particular application product. Administrators can define unified application entitlements 176 according to user accounts 131, user or device groups 132, and for specific client devices 106.

Figure 6:
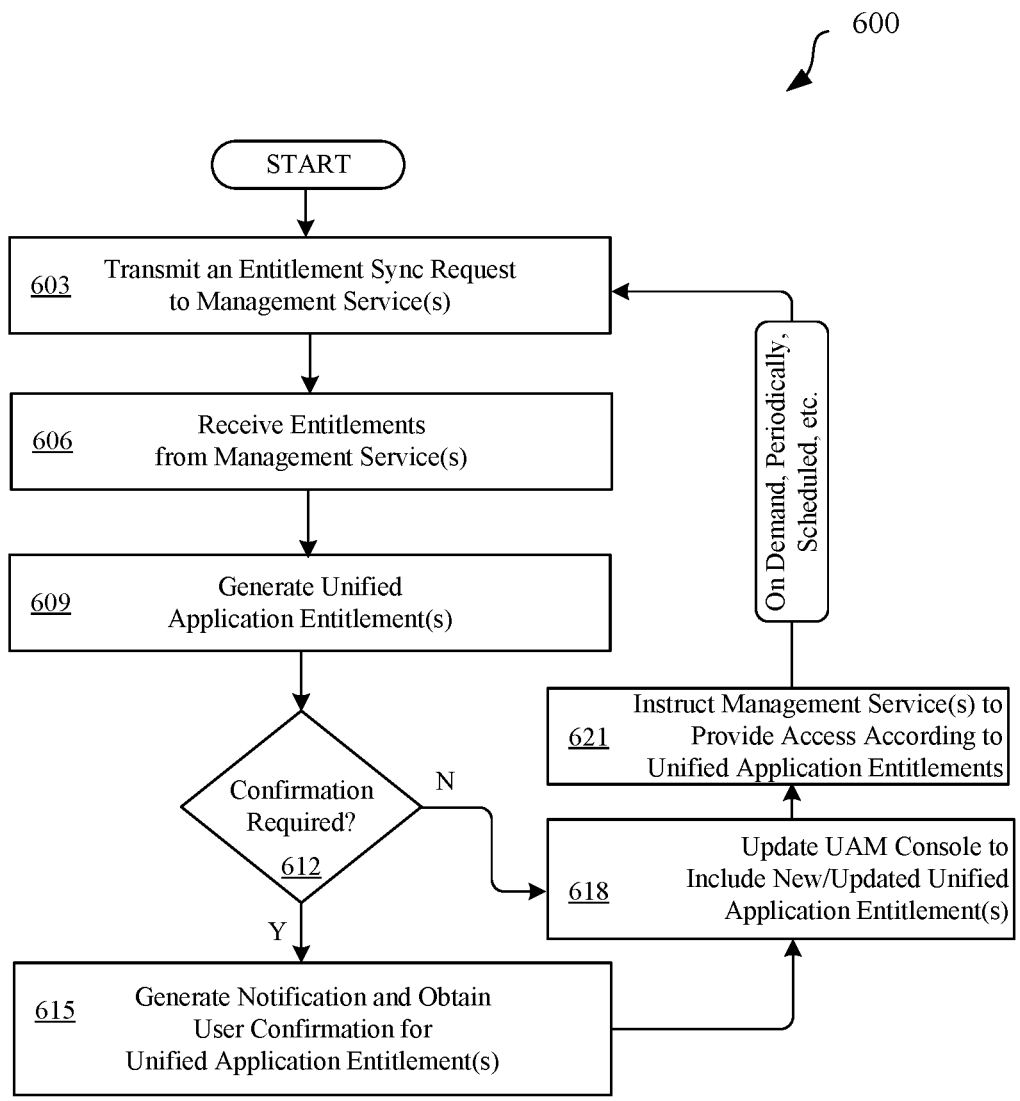
FIG. 6 is a flowchart depicting another example of functionalities performed by components of the network environment for unified application management, according to the present disclosure.

FIG. 6 is a flowchart 600 depicting another example of functionalities performed by components of the network environment for unified application management. Generally, the flowchart 600 can outline how the UAM service 121 can sync individual entitlements defined for applications 160 using one or more management service 120, and unify them into a unified application entitlement 176 for a unified application 185.

While the flowchart 600 generally refers to actions performed by the UAM service 121, certain aspects and actions are performed by other components of the networked environment 100. Although the flowchart 600 shows a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

In step 603, the UAM service 121 can transmit an entitlement sync request to a management service 120. While the example describes the interaction between the UAM service 121 and one management service 120, the UAM service 121 can transmit entitlement sync requests to multiple management services 120 concurrently, sequentially, or with partial concurrence. The entitlement sync request can be transmitted to a network endpoint of the management service 120 and can be authenticated using a token, a certificate, a username, a password, and other authentication data.

In step 606, the UAM service 121 can receive entitlement data from the management service 120. Based on the entitlement sync request, the management service 120 can identify all of the entitlements for individual applications 160 that it manages or provides access to, and can compile entitlement data. In some cases, a UAM sync service 236 can be installed as part of the management service 120 or otherwise in a management computing environment of the management service 120.

The UAM sync service 236 or the management service 120 can compile and transmit the individual application entitlement data in response to an entitlement sync request, periodically, continuously, in response to updates in the entitlements of individual applications 160 of the management service 120, and on a schedule. The UAM sync service 236 or the management service 120 can provide the application entitlement data as a single data structure, as separate entitlement data for each application 160, or another set of multiple data structures or files.

In step 609, the UAM service 121 can generate unified application entitlements 176. The UAM service 121 can process entitlement data for an individual application 160, such as which user accounts 131 and user groups 132 can access the application 160. Alternatively, the UAM service 121 can process entitlement data for a user account 131 or user groups 132, such as which applications 160 are listed for access by the user account 131 or user groups 132. The UAM service 121 can map these entitlements to a unified application 185 that includes an application variant corresponding to that application 160, and can generate new or updated unified application entitlements 176 based on this mapping.

In step 612, the UAM service 121 can determine whether administrative or other user confirmation is required to generate new or updated unified application entitlements 176. If user confirmation is required, the process can move to step 615. Otherwise, if user confirmation is not required, the process can move to step 618.

In step 615, the UAM service 121 can generate a notification and obtain user confirmation to approve the new or updated unified application entitlements 176. The notification can include a notification provided as a pop up or another user interface element of the UAM console 203. The notification can also include transmitting a short message service (SMS) message, an email message, a messenger application message, or another message to an appropriate network endpoint, such as a client device 106. The UAM console 203 or other notification can identify the new or updated unified application entitlements 176, the changes from a previous version if any, and a textual, visual, or other description of a reason that the user confirmation is requested. The user confirmation can be received by a user logging in and interacting with a user interface element of the UAM console 203, or through a message returned or transmitted to the UAM service 121.

In step 618, the UAM service 121 can update the UAM console 203 to include the new or updated unified applications 185. A user can then edit the unified application entitlements 176 through the UAM console 203. For example, the user can define a set of states or device context 154 and a specific application variant to provide for that device context 154, for all or individual user accounts 131 and user groups 132.

In step 621, the UAM service 121 can instruct a management service 120 to provide access to the applications 160 (i.e., the application variants) of a unified application 185, according to the unified application entitlements 176. This can include transmitting application entitlement data 334 to the management services 120. The management service 120 can then provide access to the applications 160, for example, as discussed with respect to FIG. 3.

Stored in the memory device are both data and several components that are executable by the processor. In particular, stored in the one or more memory devices and executable by the device processor can be applications and other executable instructions. Also, stored in the memory can be a data store and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as, object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display upon which a user interface generated by the UAM console 203, or another application can be rendered. In some examples, the user interface can be generated using user interface data provided by the management computing environment 103 and the computing environment 112. The client device 106 can also include one or more input/output devices that can include, for example, a capacitive touchscreen or other type of touch input device, fingerprint reader, or keyboard.

Although the management services 120, UAM service 121, UAM console 203, the network services, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram(s) and/or flowchart(s) shows examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   at least one computing device comprising at least one processor and at least one memory; and
   machine-readable instructions stored in the at least one memory, wherein the instructions, when executed by the at least one processor, cause the at least one computing device to at least:
   receive, from at least one management service, application metadata for a plurality of applications that are managed by the at least one management service;
   generate, by an application metadata mapper, a plurality of unified application models using the application metadata for the plurality of applications, a respective unified application model comprising an indication of a particular management service of the at least one management service, and a plurality of application parameters, the application parameters comprising an application icon parameter;
   analyze the plurality of unified application models according to application unification rules that identify a subset of the plurality of applications that are multiple application variants corresponding to multiple delivery types for a single application, wherein the subset of the plurality of applications are identified based at least in part on a threshold match among values specified for the application icon parameter in respective ones of the unified application models;
   generate a unified application that specifies the multiple delivery types for the single application, the unified application comprising a subset of the plurality of unified application models for the subset of the plurality of applications, wherein a respective one of the unified application models specifies the application metadata for a corresponding one of the application variants;
   identify a unified application entitlement for the unified application; and
   transmit, to the at least one management service, application entitlement data that instructs the at least one management service to provide access to the single application using at least one of the multiple delivery types, according to the unified application entitlement.

2. The system of claim 1, wherein the unified application entitlement defines a particular one of the subset of the plurality of applications to provide based on a particular device context of a client device.

3. The system of claim 1, wherein the multiple delivery types comprise at least two delivery types selected from a group comprising: an installable application delivery type, a thin-wrapped executable delivery type, an application volume delivery type, a virtual desktop infrastructure (VDI) delivery type, a remote desktop session host (RDSH) delivery type, and a web application delivery type.

4. The system of claim 1, wherein the respective unified application model comprises a file or data structure that specifies a platform and a version for at least one of the subset of the plurality of applications.

5. The system of claim 1, wherein the application unification rules comprise a set of application identification attributes, and the application metadata is compared to the set of application identification attributes to identify the subset of the plurality of applications.

6. The system of claim 1, wherein the instructions, when executed by the at least one processor, cause the at least one computing device to at least:
generate a user interface element that provides information for the subset of the plurality of applications, wherein the information comprises a unified application name, a set of platforms represented among the subset of the plurality of applications, and at least one source management service represented among the subset of the plurality of applications.

7. The system of claim 6, wherein the instructions, when executed by the at least one processor, cause the at least one computing device to at least:
expand the user interface element to provide additional information for the subset of the plurality of applications, wherein the additional information includes a listing of a plurality of application names corresponding to the multiple application variants of the subset of the plurality of applications, and a number of versions corresponding to a respective one of the application variants, wherein the application variants comprise at least one of: a platform-specific application variant, and a delivery-specific application variant.

8. A non-transitory computer-readable medium comprising machine-readable instructions, wherein the instructions, when executed by at least one processor, cause at least one computing device to at least:
receive, from at least one management service, application metadata for a plurality of applications that are managed by the at least one management service;
analyze a plurality of unified application models, which are generated using the application metadata, according to application unification rules that identify a subset of the plurality of applications that are multiple application variants corresponding to multiple delivery types for a single application, wherein the subset of the plurality of applications are identified based at least in part on a threshold match among values specified for an application icon parameter in respective ones of the unified application models;
generate a unified application that specifies the multiple delivery types for the single application, the unified application comprising a subset of the plurality of unified application models for the subset of the plurality of applications, wherein a respective one of the unified application models specifies the application metadata for a corresponding one of the application variants;
identify a unified application entitlement for the unified application; and transmit, to the at least one management service, application entitlement data that instructs the at least one management service to provide access to the single application using at least one of the multiple delivery types, according to the unified application entitlement.

9. The non-transitory computer-readable medium of claim 8, wherein the unified application entitlement defines a particular one of the subset of the plurality of applications to provide based on a particular device context of a client device.

10. The non-transitory computer-readable medium of claim 8, wherein the multiple application variants comprise: platform-specific application variants, and delivery-specific application variants corresponding to the multiple delivery types.

11. The non-transitory computer-readable medium of claim 8, wherein the respective unified application model comprises a file or data structure that specifies a platform and a version for at least one of the subset of the plurality of applications.

12. The non-transitory computer-readable medium of claim 8, wherein the application unification rules comprise a set of application identification attributes, and the application metadata is compared to the set of application identification attributes to identify the subset of the plurality of applications.

13. The non-transitory computer-readable medium of claim 8, wherein the multiple application variants comprise at least one of: a thin-wrapped executable application variant, an application volumes application variant, a remote desktop session host (RDSH) application variant, a virtual desktop infrastructure (VDI) application variant, a web application variant, and a platform-specific installable application variant.

14. The non-transitory computer-readable medium of claim 13, wherein the at least one management service comprises: a first management service that provides access to the platform-specific installable application variant, and a second management service provides access to at least one of: the RDSH application variant, and the VDI application variant.

15. A method performed by instructions executed by at least one processor of at least one computing device, the method comprising:
receiving, from at least one management service, application metadata for a plurality of applications that are managed by the at least one management service;
analyzing a plurality of unified application models, which are generated using the application metadata, according to application unification rules that identify a subset of the plurality of applications that are multiple application variants corresponding to multiple delivery types for a single application, wherein the subset of the plurality of applications are identified based at least in part on a threshold match among values specified for an application icon parameter in respective ones of the unified application models;
generating a unified application that specifies the multiple delivery types for the single application, the unified application comprising a subset of the plurality of unified application models for the subset of the plurality of applications, wherein a respective one of the unified application models specifies the application metadata for a corresponding one of the application variants;
identifying a unified application entitlement for the unified application; and transmitting, to the at least one management service, application entitlement data that instructs the at least one management service to provide access to the single application using at least one of the multiple delivery types, according to the unified application entitlement.

16. The method of claim 15, wherein the unified application entitlement defines a particular one of the subset of the plurality of applications to provide based on a particular device context of a client device.

17. The method of claim 15, wherein the multiple application variants comprise: platform-specific application variants, and delivery-specific application variants corresponding to the multiple delivery types.

18. The method of claim 15, wherein the respective unified application model comprises a file or data structure that specifies a platform and a version for at least one of the subset of the plurality of applications.

19. The method of claim 15, wherein the application unification rules comprise a set of application identification attributes, and the application metadata is compared to the set of application identification attributes to identify the subset of the plurality of applications.

20. The method of claim 15, wherein the multiple application variants comprise at least one of: a thin-wrapped executable application variant, an application volumes application variant, a remote desktop session host (RDSH) application variant, a virtual desktop infrastructure (VDI) application variant, a web application variant, and a platform-specific installable application variant.

* * * * *